(12) United States Patent
Brown et al.

(10) Patent No.: US 7,725,731 B2
(45) Date of Patent: May 25, 2010

(54) SYSTEM AND METHOD FOR MANAGING ACCESS TO FUNCTIONS SUPPORTED BY A MULTI-FUNCTION PORT

(75) Inventors: Norman P. Brown, Tomball, TX (US); Roger A. Cao, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1538 days.

(21) Appl. No.: 10/918,908

(22) Filed: Aug. 16, 2004

(65) Prior Publication Data
US 2006/0037084 A1 Feb. 16, 2006

(51) Int. Cl.
- H04L 9/32 (2006.01)
- G06F 21/00 (2006.01)
- G06F 7/04 (2006.01)
- G06F 12/14 (2006.01)

(52) U.S. Cl. .................... 713/183; 726/17; 726/28
(58) Field of Classification Search .................. None
See application file for complete search history.

(56) References Cited

U.S. PATENT DOCUMENTS

| | | | |
|---|---|---|---|
| 6,138,240 A * | 10/2000 | Tran et al. .................... 726/19 |
| 6,145,029 A * | 11/2000 | Deschepper et al. .......... 710/36 |
| 6,266,715 B1 | 7/2001 | Loyer et al. |
| 6,279,060 B1 | 8/2001 | Luke et al. |
| 6,415,342 B1 | 7/2002 | Wahl et al. |
| 6,542,946 B1 | 4/2003 | Wooten |
| 6,618,788 B1 | 9/2003 | Jacobs |
| 6,633,933 B1 | 10/2003 | Smith et al. |
| 6,912,663 B1 * | 6/2005 | Dayan et al. .................. 726/16 |
| 2003/0208698 A1 * | 11/2003 | Chou et al. ................. 713/202 |

OTHER PUBLICATIONS

David et al, "how about autoplay for usb drives?", http://www.annoyances.org/exec/forum/w inxp/t1036775953, Apr. 16, 2004, 2 pages.

Microsoft Corporation, "How To: Disable the Use of USB Storage Devices in Windows XP", http://support.microsoft.com/default.aspx?scid= kb;en-us;823732, Apr. 20, 2004, 2 pages.

Detwiler, James, "Disable USB ports to prevent unauthorized data transfers", http://techrepublic.com.com/5102-6255-5030674.html, Apr. 16, 2004, 1 pages.

* cited by examiner

Primary Examiner—Kaveh Abrishamkar (57) ABSTRACT

According to at least one embodiment, a system comprises an interface means for supporting a plurality of functional accesses; and means for selectively limiting on a per user basis access to certain ones of said plurality of functional accesses via the interface means.

29 Claims, 5 Drawing Sheets

SYSTEM AND METHOD FOR MANAGING ACCESS TO FUNCTIONS SUPPORTED BY A MULTI-FUNCTION PORT

BACKGROUND

Multi-function computer ports that support a plurality of different types of functions are available. For instance, USB (Universal Serial Bus) ports are commonly implemented in computer systems. Such USB ports support interfacing input devices (e.g., keyboards, mice, joysticks, scanners, cameras, etc.), output devices (e.g., printers, etc.), storage devices (e.g., USB mass storage drives, etc.), audio devices (e.g., MP3 players, etc.), communication devices (e.g., modems, etc.), and networking devices (e.g., Network Interface Card (NIC), etc.), as examples. For example, at one instance a user may couple an input device to a USB port for use in inputting information to the computer system, and at another instance the user may couple a storage device to the USB port for storing information from the computer system to the coupled storage device. Thus, various types of functions may be performed through such a multi-function port, such as inputting information to the computer system, outputting information from the computer system, storing information from the computer system (e.g., to a mass storage device), etc.

SUMMARY

According to at least one embodiment, a method for managing access to a plurality of functions supported by a multi-function port is provided. The method for managing access to a plurality of functions supported by a multi-function port, the method comprising: selecting on a per user basis to limit access to at least one function of the plurality of functions supported by the multi-function port; detecting an attempt by a specific user to access the at least one function via the multi-function port; determining whether the specific user is authorized to access the at least one function; and enabling access by the specific user to the at least one function supported by the multi-function port if said user is authorized.

According to at least one embodiment, a method for managing access to a plurality of functions supported by a multi-function port is provided. The method for managing access to a plurality of functions supported by a multi-function port, the method comprising: selecting to limit access to at least one function of the plurality of functions supported by the multi-function port; storing the selection associated with an operating system (OS) as a configuration that the OS uses to verify access to the at least one function; detecting an attempt to access the at least one function via the multi-function port; determining whether said access to the at least one function is authorized by reading the stored configuration; and enabling access to the at least one function supported by the multi-function port if said access is authorized.

According to at least one embodiment, a system for managing access to a plurality of functions supported by a multi-function port is provided. The system for managing access to a plurality of functions supported by a multi-function port, the system comprising: at least one multi-function port operable to support a plurality of functions; information stored to a data storage device that defines for a specific user of a plurality of users whether access for the specific user to at least one function of the plurality of functions is authorized; and process executable to determine, upon a requested access from the specific user for the at least one function via the multi-function port, whether said requested access is authorized based at least in part on said stored information.

According to at least one embodiment, a system comprising: an interface means for supporting a plurality of different types of functional accesses; and means for selectively limiting on a per user basis access to certain ones of said plurality of different types of functional accesses via the interface means.

According to at least one embodiment, a system comprising: at least one Universal Serial Bus (USB) port operable to support a plurality of functions, where access by a specific user to at least one function of the plurality of functions is limited; and process executable to determine, upon a requested access from the specific user for the at least one function via the at least one USB port, whether the requested access is authorized.

DETAILED DESCRIPTION

Figure 1:
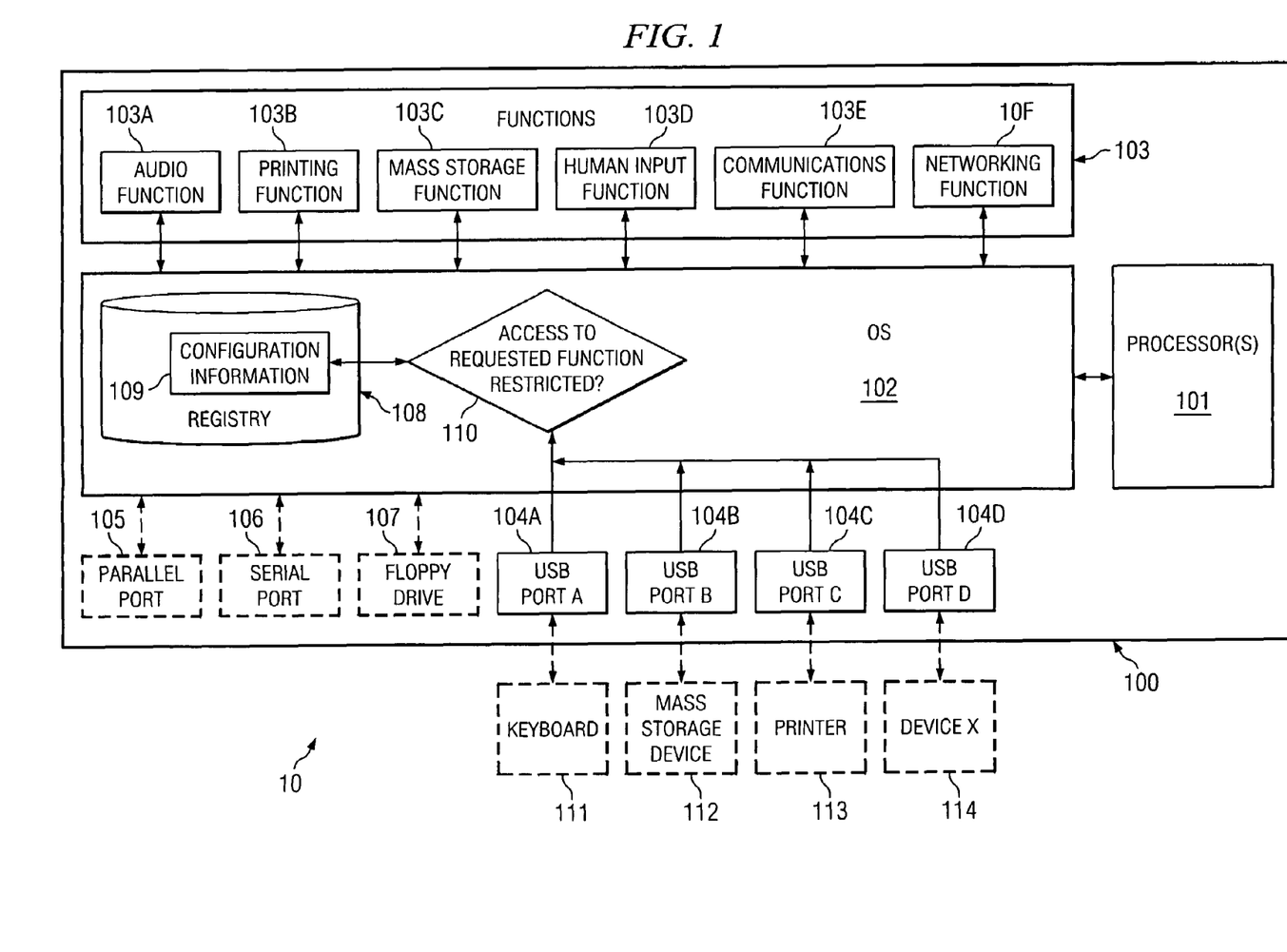
FIG. 1 shows an example system adapted according to one embodiment for managing access to functions supported by a multi-function port.

Turning to FIG. 1, an example system 10 adapted according to one embodiment for managing access to functions supported by a multi-function port is shown. System 10 includes a processor-based device 100 (e.g., a personal computer (PC), laptop computer, thin client, etc.) that includes one or more processors 101. In this example, an operating system ("OS") 102 is executing on system 100 to manage access to various functions 103 via USB ports 104A-D. While USB ports 104A-D are shown in the example system 10 of FIG. 1, any other multi-function ports (that are capable of supporting a plurality of different functions, such as the various functions 103) that are now known or later developed may be included instead of or in addition to USB ports 104A-D in other embodiments, including without limitation Firewire/ 1394 ports. Also, while four USB ports (104A-D) are shown in the example of FIG. 1, other implementations may comprise any number of such multi-function ports.

OS 102 may manage various applications and/or hardware resources of processor-based device 100, as is known in the art. OS 102 may be any OS now known or later developed, such as WINDOWS (e.g., WINDOWS ME, WINDOWS XP, WINDOWS CE, etc.), UNIX, LINUX, VMS, which is adapted to manage access to functions supported by a multi-function port (e.g., USB port) in the manner described further herein. Other suitable support processes, such as device drivers, whether embedded in OS 102 or not, may be used to facilitate management of access to functions by a multi-function port. OS 102, however, handles the requests for access to functions of a multi-function port using driver controls according to a hierarchy of drivers.

Figure 2:
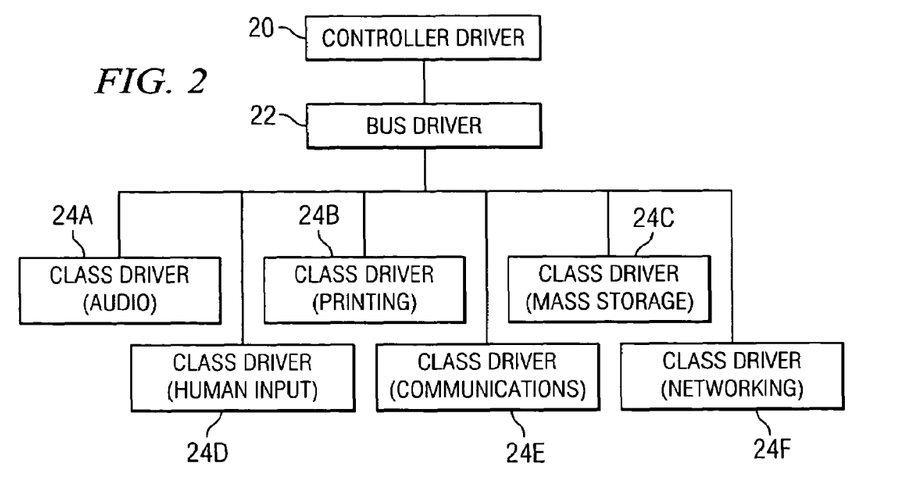
FIG. 2 shows an example of a hierarchy of driver control that may be used to manage access to functions supported by a multi-function port.

To illustrate the preceding, FIG. 2 shows an example of an embodiment of a hierarchy of drivers that the OS may use to manage access to functions by a multi-function port. A bus controller driver 20 at the OS controls the overall function of the multi-function port. At the next level, a bus driver 22 controls, or drives, the bus that connects the multi-function ports. When a request for a specific function is received from a multi-function port, bus driver 22 accesses the next level of the hierarchy, the class drivers 24A-F. Each class driver 24A-F controls the access to drivers that support the specified function. For example, for a mass storage function request, bus driver 22 calls class driver 24C, which in turn, if enabled, calls the mass storage drivers adapted to service the request. In this instance, class driver 24A may be enabled to provide the functions of audio services at the processor-based system 10, while class driver 24C may be disabled so that functions associated with mass storage can not be serviced at processor-based system 10.

According to another embodiment, bus driver 22 accesses at least one registry key to locate and load the appropriate class driver 24. For example, a registry key may specify a defined driver for mass storage class driver 24C as follows:

[HKEY_LOCAL_MACHINE\Drivers\USB\Client Drivers\Mass_Storag_Class]
"DLL"="USBMSC.DLL"
"Prefix"="DSK"

The defined driver is specified as "USBMSC.DLL", which corresponds to a class driver produced by MICROSOFT for USB storage. The registry key may comprise any other suitable defined driver. A "dummy" driver may be used to replace the defined driver in order to disable the appropriate class driver 24C. A "dummy" driver may be described as any tool used in place of another working driver, where the dummy driver resembles the actual driver but does not have the functionality of the working driver it is replacing. In this embodiment, the "dummy" driver may be designed as a driver that fails an access to the mass storage driver so as to disable mass storage functions through a USB port. The "dummy" driver may be implemented by modifying the registry key to reflect a new DLL association, i.e. "DLL"="HPUSBMSC.DLL", where HPUSBMSC.DLL corresponds to the "dummy" driver. Any other suitable file name may be used for the "dummy" driver, and any other suitable registry modification may be performed to implement loading of the "dummy" driver instead of a working driver.

Moreover, class driver 24C (associated with mass storage function) may be configured with data, such as a registry bit, as an example, that signals OS 102 to limit or allow access to device drivers that provide the mass storage function to the multi-function port. In another embodiment, OS 102 comprises a registry 108 that includes configuration information 109 for each type of function such that a specific function may be restricted by configuring the registry in a manner that limits access to the device driver that facilitates the specific function at the multi-function port. Registry 108 may be described as the repository for registration settings, configuration files, or database associated with registration of software and hardware at processor-based device 100. Although a defined set of class drivers 24 are illustrated, any other suitable number of class drivers 24 may be used to support a corresponding number of functions.

Returning to FIG. 1, in addition to USB ports 104A-D (and/or other multi-function ports), in certain implementations processor-based device 100 may include various other ports, such as parallel port 105, serial port 106, floppy drive 107, optical drive (e.g., CD and/or DVD drive) (not shown in the example of FIG. 1), as examples. Although the term "multi-function port" is used in this document to generally refer to a USB port, any other suitable port, for example a parallel port and/or serial port, may be referred to as a multi-function port if is managed by OS 102 in the form of a hierarchy of drivers as shown in FIG. 2, where a class driver 24 calls the specific driver that supports the function requested if the class driver is enabled for the specific function. For example, a serial port is a multi-function port if the serial port may be accessed by communicating to OS 102 that a printing function is requested for that serial port and a class driver is enabled to provide that function for the serial port.

In the example of FIG. 1, functions 103 that are supported by (e.g., accessible by) USB ports 104A-D include audio function 103A (e.g., transferring MP3 files to an MP3 player attached to any one of USB ports 104A-D), printing function 103B (e.g., printing information to a printer attached to any one of USB ports 104A-D, such as printer 113 attached to USB port 104C), mass storage function 103C (e.g., storing information to a mass storage device coupled to any one of USB ports 104A-D, such as mass storage device 112 coupled to USB port 104B), human input function 103D (e.g., inputting information via a keyboard, mouse, or other input device attached to any one of USB ports 104A-D, such as keyboard 113 attached to USB port 104A), communications function 103E (e.g., communicating information via a modem or other communication device coupled to any one of USB ports 104A-D), and networking function 103F (e.g., networking with one or more other processor-based devices via a NIC, wireless router, and/or other networking device coupled to any one of the USB ports 104A-D). Other functions in addition to or instead of the example functions 103A-E of FIG. 1 may be included in certain implementations, and access to such other functions via USB ports 104A-D may be managed in a manner as described further herein with regard to functions 103A-E.

Generally, device drivers are implemented on system 10 for supporting performance of functions 103 via USB ports 104A-D. For instance, upon initially coupling a USB mass storage device to one of USB ports 104A-D, OS 102 may recognize that such device is a new device that has not previously been coupled to processor-based device 100, and so a device driver for supporting the operation of storing information to the USB mass storage device may be installed to processor-based device 100 (e.g., from the USB mass storage device and/or from a remote server via a communication network, such as the Internet). Alternatively, the device driver for a given device, such as the USB mass storage device, may be provided on a CD or floppy disk (or other computer-readable medium), and a user may be required to install the associated device driver before using the given device. As previously explained, a device driver may facilitate the access of functions by the multi-function port. In most instances, the device driver may be a process called by the OS provided USB class driver in order for the device driver to provide the specific function requested for the multi-function port.

Traditionally, a USB port is either enabled or disabled (e.g., in the computer system's BIOS (Basic Input/Output System)). If a USB port is enabled in the BIOS, then it may be used for all functions that it supports. For instance, if a USB port is enabled in the BIOS, then a user may couple devices to such enabled USB port to perform any of the various functions 103 that is supported by the USB port. Of course, installation of the device drivers needed for supporting a given function may be restricted in certain systems (e.g., a system administrator may have the only privileges for installing device drivers to a computer), but as for the functions that are supported (e.g., those for which a device driver has been installed), users may access any of such functions via the enabled USB port. If, on the other hand, a USB port is disabled in the BIOS, then no functions are accessible via such USB port. That is, the USB port is fully disabled, and no functions are available to users via such disabled USB port.

In some instances, it is desirable to selectively disable (or restrict access) to certain ones of the functions that are accessible by a USB port, without disabling the full USB port. For example, a system administrator (or other user) may desire to restrict (e.g., disable) access to mass storage function 103C so that unauthorized users (which may be all users) are not able to perform the mass storage functionality via the USB ports 104A-D (e.g., to prevent an unauthorized user from storing information from the computer system to a USB mass storage device). The administrator may further desire to allow human input functionality 103D to be performed unrestricted via the USB ports 104A-D. Thus, in this example, an administrator may desire to restrict (e.g., disable) access to mass storage functionality 103C via USB ports 104A-D, while permitting unrestricted (e.g., enabled) access to human input function 103D via such USB ports 104A-D. The traditional technique for enabling/disabling USB ports in the computer's BIOS is unsatisfactory for the administrator's desires in this case. With traditional techniques, if the USB ports 104A-D are disabled in the BIOS, then none of functions 103 are accessible via the disabled ports (and thus the administrator's desire of enabling human input function 103D via those ports is not met), and if the USB ports 104A-D are enabled in the BIOS, then all of the supported functions 103 are accessible via the enabled ports (and thus the administrator's desire of disabling access to the mass storage function 103C is not met).

Certain embodiments are provided herein that enable various different functions that are supported by a multi-function port (e.g., USB port) to be selectively restricted (e.g., disabled, password protected, etc.). Thus, for instance, the multi-function port may be enabled in the BIOS, but the supported functions that are permitted to be performed by the enabled port may be selectively restricted. Accordingly, certain embodiments provided herein enable the administrator in the above example to selectively restrict (e.g., disable or password protect) access to mass storage functionality 103C via USB ports 104A-D, while selectively leaving access to human input function 103D via such USB ports 104A-D unrestricted.

In the example embodiment of FIG. 1, OS 102 is adapted to use configuration information 109 stored to a registry, configuration file, or database 108 for managing the access to functions 103. More specifically, OS 102 is adapted to determine (process 110), based at least in part on configuration information 109, whether access to a requested function via any of USB ports 104A-D is restricted. For instance, a user (e.g., system administrator) may specify in configuration information 109 which of functions 103A-F are restricted (e.g., disabled, password protected, etc.) for USB ports 104A-D and which of functions 103A-F are unrestricted for USB ports 104A-D.

As shown, in the specific example of FIG. 1, a user may couple a keyboard 111 to USB port 104A for use in performing human input function 103D, whereupon OS 102 determines (process 110) based on configuration information 109 whether such human input function 103D is restricted. As similarly shown in the example of FIG. 1, a user may couple a mass storage device 112 to USB port 104B, a printer 113 to USB port 104C, and/or another type of device (device "X") 114 (e.g., audio device, modem, NIC, etc.) to USB port 104D, and OS 102 determines (process 110) based on configuration information 109 whether the corresponding functions performable by each coupled device 112, 113, 114 are restricted.

To illustrate the preceding, and not by way of limitation, coupling a mass storage device 112 to any USB port 104 may trigger OS 102 to access the USB class driver associated with mass storage function to request access to the device driver for mass storage device 112. In this example, configuration information 109 may indicate that mass storage functions are restricted for the user, a group of users, or all users of system 10. The USB class driver for mass storage function may be configured, based on configuration information 109, to restrict access to the device driver, or to request a user password to access the device driver. In this instance, if access to the device driver is restricted, such as by clearing or setting a registry setting pertinent to the USB Class driver that disables the mass storage function, as an example, the USB class driver does not attempt to locate the device driver for the mass storage device. If the access to the device driver is limited by password protection, the USB class driver may trigger a password process that may prompt the user to supply the proper password before loading the device driver for the mass storage device.

Of course, selectively restricting access to certain ones of functions 103A-F via multi-function ports (e.g., USB ports 104A-D) in configuration information 109 does not mean that access to the restricted functions is restricted for other interfaces. For example, configuration information 109 may disable mass storage function 103C for USB ports 104A-D, but such disablement of mass storage function 103C for the USB ports does not necessarily mean that the ability to perform storage of information via floppy drive 107, for instance, is disabled. Rather, in this example, configuration information 109 specifies any restrictions that are in place for the USB ports 104A-D, and other interfaces of system 100 may or may not be enabled (as may be specified by other information of such system 100, e.g., its BIOS). Certain embodiments provided herein have particular utility for so-called thin clients, which often do not include many interfaces. For instance, a thin client may include one or more USB ports, but may not include a floppy drive, optical drive, etc. Thus, the USB ports may be the only interfaces available on such thin clients for accessing certain functions (e.g., for human input via human input devices, for mass storage to mass storage devices, etc.), and thus managing the access to functions supported by the USB ports may provide a system administrator great control over which functions are permitted at such thin client. Of course, the various embodiments provided herein are not limited in application to thin clients, but may likewise be applied to other types of systems that include multi-function ports (e.g., USB ports).

Figure 3:
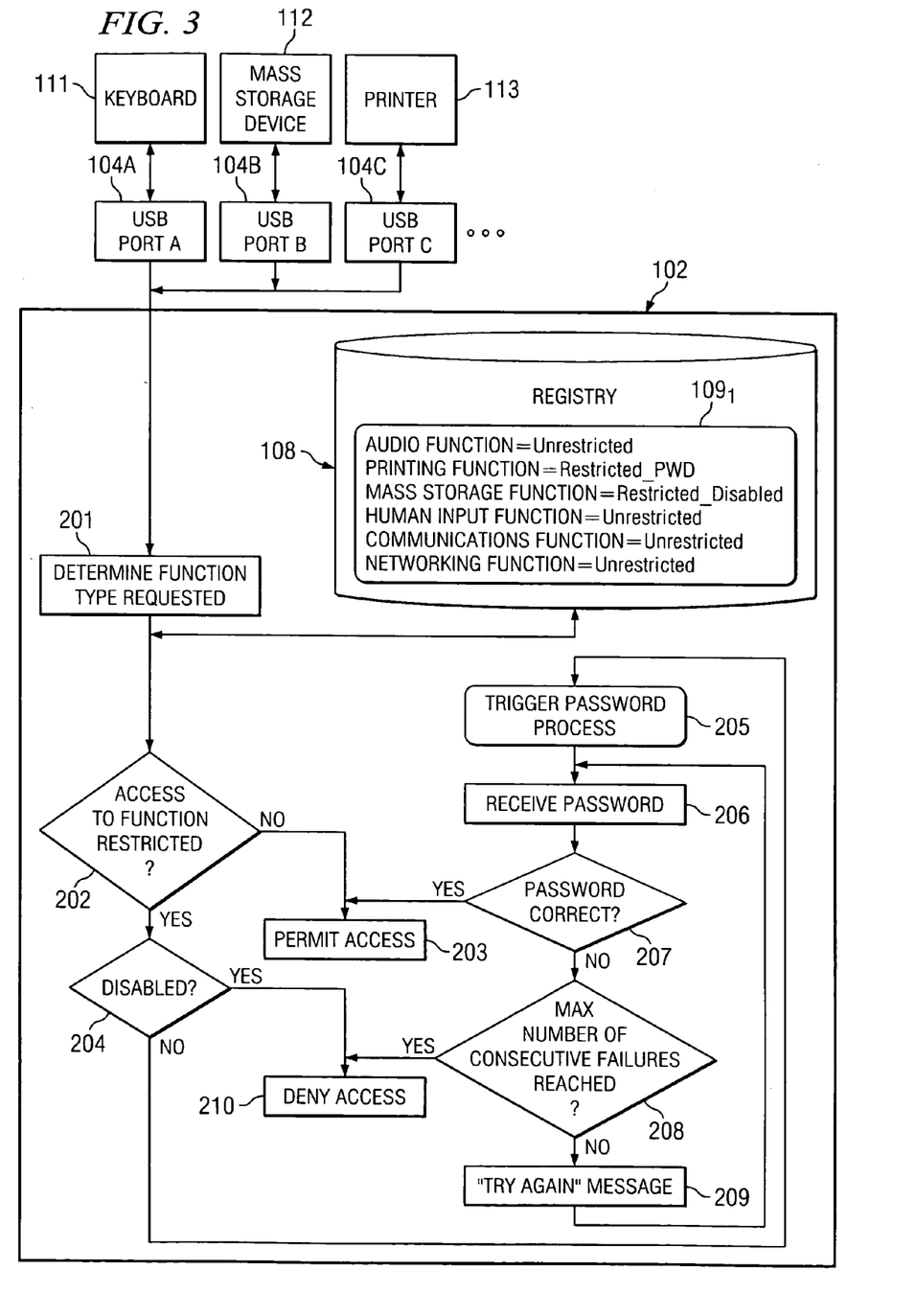
FIG. 3 shows, in further detail, an example implementation of the system of FIG. 1 in accordance with one embodiment.

Turning now to FIG. 3, an example implementation of system 10 in accordance with one embodiment is shown further. In FIG. 3, a specific example of configuration information 109, labeled $109_1$, is shown. In this example, configuration information $109_1$ has been supplied (e.g., by a system administrator) to specify that audio function 103A, human input function 103D, communications function 103E, and networking function 103F are unrestricted for USB ports 104A-D. Configuration information $109_1$ further specifies that printing function 103B and mass storage function 103C are restricted (or "protected") for USB ports 104A-D. In this example, two techniques are available for restricting (or "protecting") access to a given function via USB ports 104A-D. First, access to a given function via USB ports 104A-D may be disabled. Second, access to a given function via USB ports 104A-D may be password protected so that only a user that supplies the proper password is permitted access to such given function via USB ports 104A-D.

In the example configuration $109_1$, printing function 103B is restricted with password protection (shown as "Restricted_PWD" in FIG. 3). Thus, if a user attempts to perform printing via a printer coupled to any of USB ports 104A-D (e.g., printer 113 coupled to USB port 104B), such function is permitted only if the user supplies the proper password. In this regard, certain "authorized" users (e.g., system administrators) that possess the proper password are capable of printing information from system 100 to a printer coupled to one of USB ports 104A-D, while other "unauthorized" users are not capable of printing information from system 100. In other embodiments, the user may be requested to supply the proper password during boot-up of processor-based device 100, or in response to any other suitable event that may cause loading of device drivers, USB class driver, USB bus driver, some, all, or a combination of the preceding. In another embodiment, the user may be requested to supply a password if the function type requested is a restricted function that has not been disabled.

Further, in the example configuration $109_1$, mass storage function 103C is disabled (shown as "Restricted_Disabled" in FIG. 3). Thus, if a user attempts to store data to a mass storage device coupled to any of USB ports 104A-D (e.g., mass storage device 112 coupled to USB port 104B), such function is not permitted. As described further hereafter, in certain embodiments a configuration may be provided on a per-user basis, wherein a given function (e.g., storing to mass storage device 112) may be disabled for certain users and enabled for certain other users. Accordingly, the permitted access to functions 103 may depend on the particular user that is logged on to processor-based device 100.

In the example embodiment of FIG. 3, upon a user requesting to perform a given type of function 103 via one of USB ports 104A-D (e.g., upon a user coupling a corresponding device for performing such function and/or upon a user initiating performance of such function to a coupled device), OS 102 determines (process 201) the function type requested (e.g., which of functions 103A-F). OS 102 then determines (process 202), based at least in part on configuration information $109_1$, whether access to the requested function type is restricted. Considering the example configuration information $109_1$ of FIG. 2, if a request is received for audio function 103A, human input function 103D, communication function 103E, or networking function 103F, then OS 102 determines in process 202 that the requested function is unrestricted, and thus permits access to the requested function (process 203); on the other hand, if a request is received for printing function 103B or mass storage function 103C, then OS 102 determines in process 202 that the requested function is restricted.

If determined in process 202 that the requested function is restricted, OS 102 determines whether the requested function is disabled (process 204). Again considering the example configuration information $109_1$ of FIG. 3, if the requested function is mass storage function 103C, then OS 102 determines in process 204 that such requested function is disabled and denies access (in process 210). If, on the other hand, OS 102 determines that the restricted function is not disabled (but is instead password protected), OS 102 triggers (in process 205) a password process. Such password process may, for example, generate a user interface prompting the user for a password. The password process receives (process 206) a password from the user, and determines (process 207) whether the received password is correct. The correct password may be identified in configuration information $109_1$ and/or in some other stored information accessible by the password process, and thus the password process may access such information and compare the received password against the identified correct password to determine if the received password is correct.

If the received password is determined by the password process to be correct, then the OS 102 permits access to the restricted function (process 203), for example, by allowing a USB class driver to load the device driver corresponding to the restricted function. On the other hand, if the received password is not correct, the password process may determine (process 208) whether a maximum number of consecutive incorrect passwords have been received (e.g., three consecutive incorrect passwords). If the maximum number of consecutive incorrect passwords have not been received, then the password process prompts the user to try again (process 209) and receives another password from the user (process 206). If determined (in process 208) that the maximum number of consecutive incorrect passwords has been reached, then the OS 102 denies access to the restricted function (process 210), for example, by not allowing the USB class driver to load the device driver corresponding to the restricted function.

In view of the above, access to different types of functions supported by a USB port may be selectively restricted. More particularly, in accordance with certain embodiments, configuration information defining restrictions for functions that are supported by a multi-function port (e.g., USB port) may be received. For instance, a user (e.g., system administrator) may update a registry, configuration file, or database 108 to supply configuration information 109 defining the restrictions desired for various functions supported by a USB port. Upon access to a given function being requested, the OS determines if the given function is restricted (e.g., disabled, password protected, etc.), as specified by the configuration information 109. If the given function is restricted, then the OS determines if the requested access is authorized (e.g., if the given function is password protected, then the OS determines if the proper password is received). If the requested access is not authorized, then access is denied by the OS.

Figure 4:
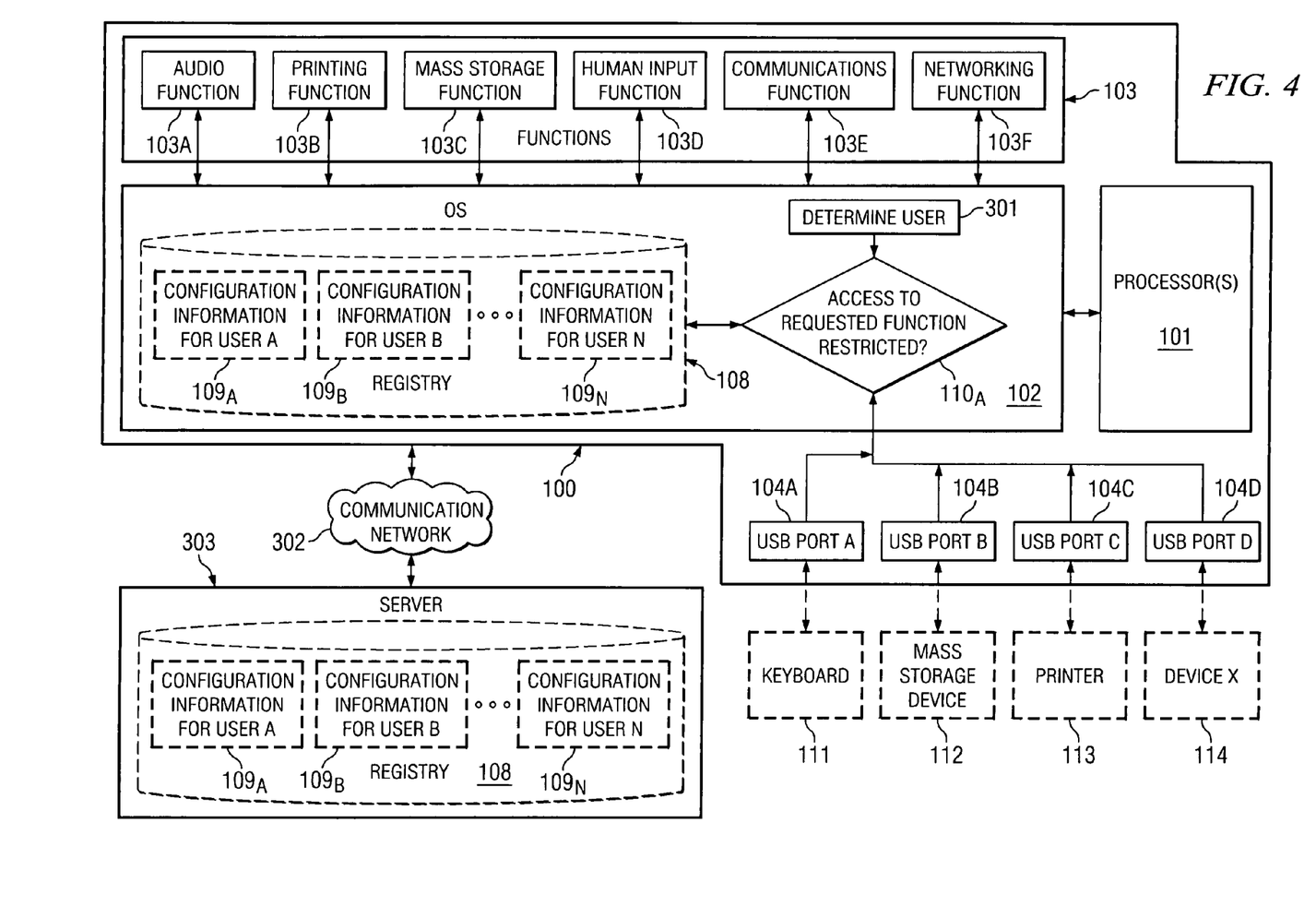
FIG. 4 shows still another example implementation of the system of FIG. 1 in accordance with one embodiment, wherein configuration information is defined on a per-user basis.

FIG. 4 shows still another example implementation of system 10 in accordance with one embodiment, wherein configuration information is defined on a per-user basis. In this example, registry 108 (configuration file, or database) includes configuration information 109 for a plurality of different users. More particularly, configuration information is provided for "N" different users, wherein "N" may be any number. Thus, registry 108 includes configuration information 109A for a first user (User A), configuration information 109B for a second user (User B), . . . , and configuration information 109N for an Nth user (User N). As further shown in this example, such configuration information 109A-N may be stored locally in registry 108 on processor-based device 100 and/or such configuration information 109A-N may be stored remotely on a server 303 that is at least temporarily communicatively accessible by processor-based device 100 via communication network 302 (e.g., the Internet or other Wide Area Network (WAN), Local Area Network (LAN), public or private switched telephony network, wireless network, any combination of these and/or any other communication network now known or later developed for permitting two or more processor-based devices to communicate with each other). Thus, for instance, a user (e.g., system administrator) may, in certain implementations, define the configuration information 109A-N on server 303 and such configuration information 109A-N may be accessed by OS 102 via communication network 302 and/or such configuration information 109A-N may be pushed from server 303 to processor-based device 100 for local storage thereto. While not shown in the examples of FIGS. 1 and 3, configuration information 109 of each of those examples may likewise be stored to a remote server 303 instead of or in addition to being stored locally to processor-based device 100.

In the example embodiment of FIG. 4, OS 102 determines (process 301) which user is requesting access to a given function, and based at least in part on the user's corresponding configuration information 109A-N, OS 102 determines ($110_A$) whether such access is restricted/authorized. For instance, in certain implementations, the OS 102 may determine the user requesting access to a function as being a user logged on to the processor-based device 100 at the time the access request is received. For example, suppose user A is logged on to processor-based device 100 and couples mass storage device 112 to USB port 104B in attempt to perform mass storage function 103C, and further suppose that configuration information 109A for user A specifies that mass storage function 103C is disabled; in this case, OS 102 determines that user A is requesting the mass storage function 103C and does not permit such access to this function (because user A's configuration information 109A specifies that this function is disabled for user A). Now suppose that user B (e.g., a system administrator) logs on to processor-based device 100 and couples mass storage device 112 to USB port 104B in attempt to perform mass storage function 103C, and further suppose that configuration information 109B for user B specifies that mass storage function 103C is unrestricted; in this case, OS 102 determines that user B is requesting the mass storage function 103C and permits access to this function. Accordingly, different restrictions on the types of functions that may be accessed via USB ports 104A-D may be specified for different users.

Figure 5:
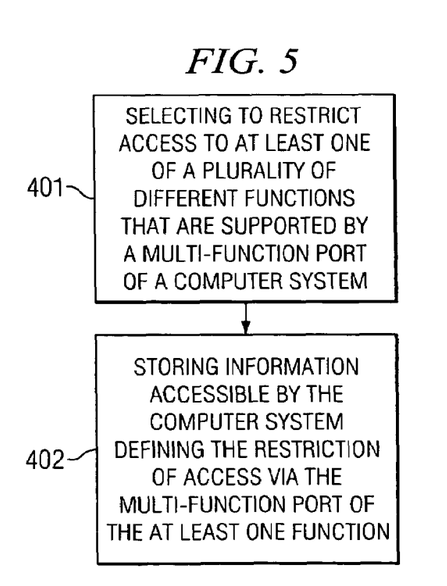
FIG. 5 shows an example operational flow diagram according to one embodiment for managing access to functions supported by a multi-function port.

Turning now to FIG. 5, an example operational flow diagram according to one embodiment for managing access to functions supported by a multi-function port (e.g., USB port) is shown. As shown, in operational block 401, access to at least one of a plurality of different functions 103A-F that are supported by a multi-function port (e.g., USB ports 104A-D) of a computer system may be selectively restricted (e.g., by a system administrator). As described above, in certain embodiments, the access may be selectively restricted on a per-user basis. In operational block 402, information (e.g., configuration information 109) is stored such that it is accessible by the computer system, wherein such information defines the restriction of access via the multi-function port (e.g., USB port) of the at least one function. For instance, configuration information 109 may be stored locally to or remotely from processor-based device 100, and such configuration information 109 may define a restriction (for at least one user) on accessing at least one function 103A-F via USB ports 104A-D.

Figure 6:
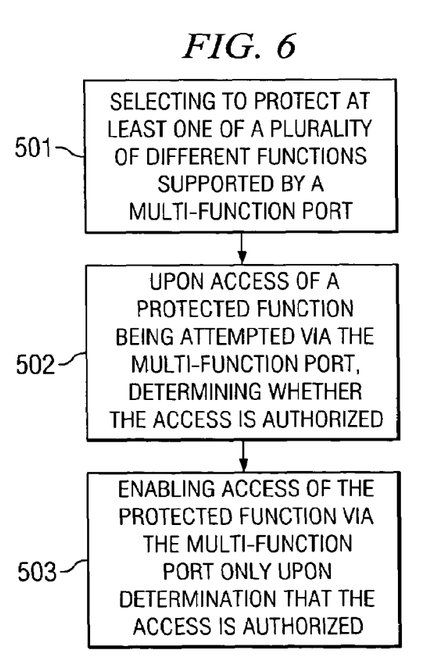
FIG. 6 shows another example operational flow diagram for managing access to functions supported by a multi-function port in accordance with one embodiment.

FIG. 6 shows another example operational flow diagram for managing access to functions supported by a multi-function port in accordance with one embodiment. In operational block 501, at least one of a plurality of different functions 103A-F that are supported by a multi-function port (e.g., USB ports 104A-D) are selectively protected. For instance, a system administrator may select (for at least certain users) to protect (or restrict) access to certain functions, such as mass storage function 103C, that are supported by USB ports 104A-D. In operational block 502, upon access of a protected function being attempted via the multi-function port (e.g., USB ports 104A-D), OS 102 determines whether the access is authorized. For instance, upon a user attempting to couple a mass storage device 112 to any of USB ports 104A-D and/or upon a user attempting to initiate storing of data from processor-based device 100 to such mass storage device 112, OS 102 determines (based at least in part on configuration information 109) whether to permit such function. In operational block 503, access of the protected function via the multi-function port is enabled (or permitted) by OS 102 only upon determination that the requested access is authorized (e.g., for the requesting user).

Figure 7:
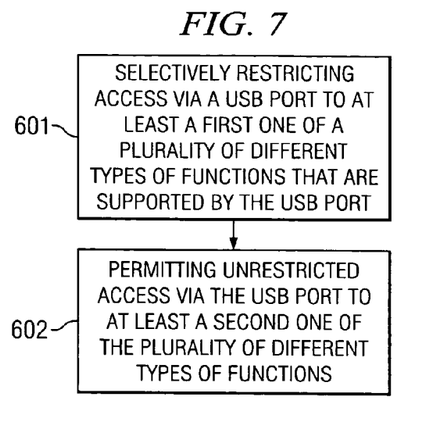
FIG. 7 shows an example operational flow diagram for certain embodiments of managing access to functions supported by a multi-function port, wherein access to at least one supported function via a multi-function port is selectively restricted and access to at least one supported function via the multi-function port is unrestricted.

FIG. 7 shows another example operational flow diagram for certain embodiments of managing access to functions supported by a multi-function port, wherein access to at least one supported function via a multi-function port is selectively restricted and access to at least one supported function via the multi-function port is unrestricted. As shown, in operational block 601 accesses via a USB port to at least a first one of a plurality of different types of functions that are supported by the USB port are selectively restricted. For instance, as shown in the example configuration information $109_1$ of FIG. 3, a system administrator may selectively restrict access to certain functions (e.g., printing function 103B and mass storage function 103C in the example configuration information $109_1$) that are supported by USB ports 104A-D. As described further above, the selection of restrictions placed on the supported functions may be provided on a per-user basis, and may thus vary from user to user. In operational block 602, unrestricted access via the USB port to at least a second one of the plurality of different types of functions is permitted. For instance, access to certain functions (e.g., audio function 103A, human input function 103D, communications function 103E, and networking function 103F in the example configuration information $109_1$ of FIG. 3) via USB ports 104A-D may be permitted unrestricted. Again, the functions that are permitted to be accessed unrestricted may be defined on a per-user basis, and thus may vary from user to user.

Figure 8:
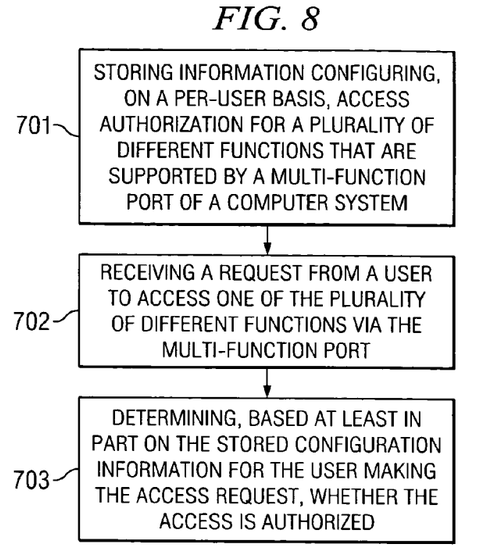
FIG. 8 shows an example operational flow diagram for certain embodiments of managing access to functions supported by a multi-function port, wherein restrictions on access to such functions are defined on a per-user basis.

FIG. 8 shows an example operational flow diagram for certain embodiments of managing access to functions supported by a multi-function port, wherein restrictions on access to such functions are defined on a per-user basis. In operational block 701, information for configuring, on a per-user basis, access authorization for a plurality of different functions 103 that are supported by a multi-function port of a computer system are stored. For instance, configuration information 109A-N are stored in the example of FIG. 4 described above. In operational block 702, a request from a user to access one of the plurality of different functions via a multi-function port is received. In operational block 703, a determination is made, based at least in part on the stored configuration information for the user making the access request, whether the access is authorized.

Figure 9:
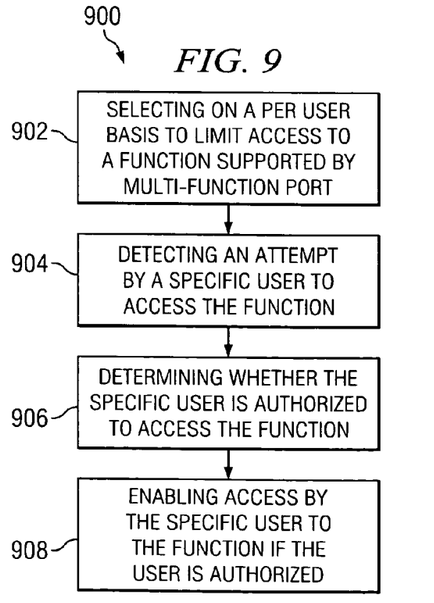
FIG. 9 shows an example operational flow diagram for an example of an embodiment for managing access to a plurality of functions supported by a multi-function port, wherein the access to a specific function is determined on a per user basis.

FIG. 9 shows an example operational flow diagram 900 for an embodiment for managing access to a plurality of functions supported by a multi-function port, wherein the access to a specific function is determined on a per user basis. For example, in operation 902, access to a specific function (or functions) of a plurality of function is limited on a per user basis. When a specific user attempts to access the specific function(s), in operational block 904, the method proceeds to operational block 906 where it is determined if the specific user is authorized to access the specific function (s). If the specific user is authorized to access the function, access by the user to the function(s) is enabled at operational block 908.

Figure 10:
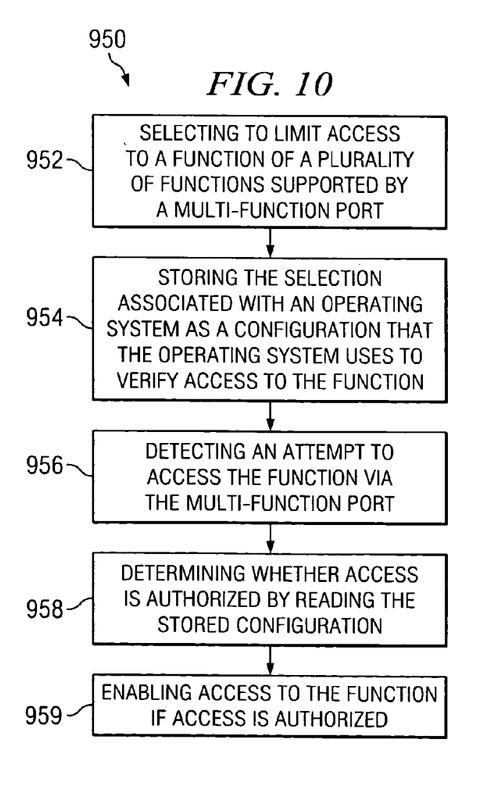
FIG. 10 shows an example operational flow diagram for an example of an embodiment for managing access to a plurality of functions supported by a multi-function port, wherein the access to a specific function is determined using a stored configuration.

FIG. 10 shows an example operational flow diagram 950 for an example of an embodiment for managing access to a plurality of functions supported by a multi-function port, wherein the access to a specific function is determined using a stored configuration. For example, in operation 952, access to a specific function (or functions) supported by a multi-function port is selectively limited. The limitation of access is associated with an OS as a configuration that the OS uses to verify access to the specific function(s) and is stored at operation block 954. When an attempt to access the function is detected at operational block 956, the method proceeds to operational block 958 to determine whether access is authorized by reading the stored configuration. If access to the specific function(s) is authorized, access is enabled at operational block 959.

In view of the above, various embodiments are provided that advantageously enable management of access to functions that are supported by a multi-function port. More particularly, access to certain ones of the functions supported by a multi-function port, such as a USB port, may be selectively restricted. Thus, access to certain functions via the multi-function port may be permitted unrestricted, while access to other functions via such multi-function port is restricted (e.g., disabled or password protected). In certain embodiments, the configuration specifying restrictions on functional accesses via a multi-functional port is defined on a per-user basis. It should be recognized that enabling selective restriction of multi-function port (e.g., USB) accesses of different types of functions provides greater management flexibility than traditional techniques of either fully disabling or fully enabling such multi-function port (via the system's BIOS).

What is claimed is:

1. A method for managing access to a plurality of different functions supported by a multi-function port of a processor-based device, the method comprising:
according to configuration information stored in the processor-based device, selecting on a per user basis to limit access to at least one function of the plurality of different functions supported by the multi-function port, wherein the multi-function port is configured to connect to any one of a plurality of different external devices, and wherein the processor-based device is responsive to requests to initiate performance of corresponding ones of the plurality of different functions;
detecting an attempt by a specific user to access the at least one function via the multi-function port;
determining whether the specific user is authorized to access the at least one function, wherein determining whether the specific user is authorized to access the at least one function comprises determining whether the at least one function is disabled for the specific user, and wherein determining whether the at least one function is disabled for the specific user comprises accessing a registry key for a class driver associated with the at least one function; and
enabling access by the specific user to the at least one function supported by the multi-function port if said user is authorized.

2. The method of claim 1, further comprising establishing a configuration that an operating system (OS) of the processor-based device uses to verify access to the at least one function, the configuration comprising the at least one function, authorization information, and a user identification associated with the specific user.

3. The method of claim 2, wherein:
the configuration is stored at a registry, configuration file, or database; and
the authorization information comprises the at least one function associated with an access level parameter that establishes whether the specific user is authorized to access the at least one function.

4. The method of claim 1 wherein the plurality of different functions comprise a plurality of ones selected from the group consisting of:
audio function, printing function, mass storage function, human input function, communications function, and networking function.

5. The method of claim 1, wherein determining whether the specific user is authorized to access the at least one function further comprises:
determining whether the at least one function is restricted via password for the specific user; and
prompting the specific user to enter a password; and
authorizing access to the at least one function in response to receiving the right password from the specific user.

6. The method of claim 1, wherein determining whether the at least one function is disabled for the specific user further comprises:
loading the class driver specified at the registry key; and
restricting access to the at least one function via the multifunction port if the class driver comprises a dummy driver.

7. The method of claim 1 wherein the multi-function port comprises a Universal Serial Bus (USB) port.

8. The method of claim 1, further comprising:
indicating, with the configuration information, that access to a second one of the plurality of functions is unrestricted, wherein the second function is different from the at least one function; and
allowing unrestricted access to the second function in response to a request for the second function by the specific user.

9. The method of claim 8, wherein the at least one function is a printing function or mass storage function, and the second function is selected from among an audio function, human input function, communications function, and networking function.

10. A method for managing access to a plurality of functions in a processor-based device supported by a multi-function port of the processor-based device, the method comprising:
selecting to limit access to at least one function of the plurality of functions supported by the multi-function port that is connectable to any one of a plurality of different external devices;
storing the selection as a configuration that an operating system (OS) in the processor-based device uses to verify access to the at least one function;

detecting, by the processor-based device, an attempt to access the at least one function via the multi-function port;

determining, by the processor-based device, whether said access to the at least one function is authorized by reading the stored configuration, wherein determining whether said access to the at least one function is authorized comprises determining whether the at least one function is disabled for a specific user, and wherein determining whether the at least one function is disabled for said user comprises accessing a registry key for a class driver associated with the at least one function;

enabling, by the processor-based device, access to the at least one function supported by the multi-function port if said access is authorized;

enabling unrestricted access to a second one of the plurality of functions, wherein the second function is different from the at least one function; and in response to a request for the second function, allowing unrestricted access to the second function by the processor-based device.

11. The method of claim 10, wherein the configuration comprises the at least one function associated with an access level parameter that establishes whether access to the at least one function is authorized.

12. The method of claim 10, wherein the plurality of functions comprise a plurality of ones selected from the group consisting of:

audio function, printing function, mass storage function, human input function, communications function, and networking function.

13. The method of claim 10, wherein determining whether said access to the at least one function is authorized further comprises:

determining whether the at least one function is restricted via password for a specific user; and prompting the user to enter a password; and authorizing access to the at least one function in response to receiving the right password from the user.

14. The method of claim 10, wherein determining whether the at least one function is disabled for said user further comprises:

loading the class driver specified at the registry key; and restricting access to the at least one function via the multifunction port if the class driver comprises a dummy driver.

15. The method of claim 10, where the multi-function port comprises a Universal Serial Bus (USB) port.

16. The method of claim 10, wherein the attempt to access the at least one function is performed when a first one of the plurality of external devices is connected to the multi-function port, and wherein the request for the second function is performed when a second, different one of the plurality of external devices is connected to the multi-function port.

17. A system for managing access to a plurality of functions supported by a multi-function port, the system comprising:

a processor;

at least one multi-function port operable to support the plurality of functions, wherein the at least one multi-function port is connectable to any one of a plurality of different external devices;

a data storage device to store information that defines for a specific user of a plurality of users whether access for the specific user to at least one function of the plurality of functions is authorized, the information to further indicate that access to a second, different one of the plurality of functions is unrestricted;

process executable on the processor to determine, upon a requested access from the specific user for the at least one function via the multi-function port, whether said requested access is authorized based at least in part on said stored information, wherein the process is to determine whether the specific user is authorized to access the at least one function by determining whether the at least one function is disabled for the specific user, and wherein the at least one function is determined to be disabled for the specific user by accessing a registry key for a class driver associated with the at least one function, and the process executable to further determine, in response to a request from the specific user for the second function, to allow unrestricted access to the second function.

18. The system of claim 17, wherein the information comprises the at least one function, authorization information, and a user identification associated with the specific user.

19. The system of claim 17, wherein the plurality of functions comprises a plurality of ones selected from the group consisting of:

audio function, printing function, mass storage function, human input function, communications function, and networking function.

20. The system of claim 17, the process further executable to determine whether said requested access is authorized by:

determining whether the at least one function is restricted via password for the specific user; and prompting the user to enter a password; and authorizing access to the at least one function in response to receiving the right password from the specific user.

21. The system of claim 17, wherein determining whether the at least one function is disabled for the specific user further comprises:

loading the class driver specified at the registry key; and restricting access to the at least one function via the multifunction port if the class driver comprises a dummy driver.

22. The system of claim 17, wherein the multi-function port comprises a Universal Serial Bus (USB) port.

23. The system of claim 17, wherein the requested access to the at least one function is performed when a first of the plurality of external devices is connected to the at least one multi-function port, and wherein the request for the second function is performed when a second, different one of the external devices is connected to the at least one multi-function port.

24. The system of claim 19, wherein the plurality of different external devices comprise a plurality of ones selected from the group consisting of:

audio device, printer, mass storage device, human input device, communications device, and networking device.

25. A processor-based device comprising:

a processor;

at least one Universal Serial Bus (USB) port operable to support a plurality of functions, where access by a specific user to at least one function of the plurality of functions is limited, and access to a second, different one of the plurality of functions is unrestricted;

a registry key; and process executable on the processor to determine, upon a requested access from the specific user for the at least one function via the at least one USB port, whether the requested access is authorized, wherein the process is executable to further allow unrestricted access to the second function in response to a request for the second function, wherein the process is to determine whether the requested access is authorized by determining whether the at least one function is disabled for the specific user, and the process is to determine whether the at least one function is disabled by accessing the registry key for a class driver associated with the at least one function.

26. The system of claim 25 further comprising;
wherein the class driver is a dummy class driver that restricts access to the at least one function via the USB port.

27. The system of claim 25, wherein the at least one function limited from being accessed by the user via the at least one USB port comprises a mass storage function.

28. The processor-based device of claim 25, wherein the at least one USB port is connectable to any one of a plurality of different external devices, wherein the at least one function is provided by a first of the external devices, and the second function is provided by a second of the external devices.

29. The processor-based device of claim 25, further comprising a storage to store configuration information specifying the limited access to the at least one function, and the unrestricted access to the second function.

* * * * *